United States Patent [19]

Seto et al.

[11] Patent Number: 5,433,074
[45] Date of Patent: Jul. 18, 1995

[54] EXHAUST GAS PURIFICATION DEVICE FOR AN ENGINE

[75] Inventors: Satomi Seto, Gotenba; Shinichi Takeshima, Susono; Satoshi Iguchi, Mishima; Toshiaki Tanaka, Numazu, all of Japan

[73] Assignee: Toyota Jidosha Kabushiki Kaisha, Toyota, Japan

[21] Appl. No.: 97,794

[22] Filed: Jul. 26, 1993

[30] Foreign Application Priority Data

Jul. 30, 1992 [JP] Japan .................................. 4-203633
Aug. 11, 1992 [JP] Japan .................................. 2-214311

[51] Int. Cl.$^6$ .............................. F01N 3/22; F01N 3/20
[52] U.S. Cl. ................................ 60/301; 60/285; 60/286; 60/289; 60/297; 422/169; 423/213.7
[58] Field of Search ............... 60/274, 301, 289, 299, 60/297, 285, 286; 422/169; 423/213.7

[56] References Cited

U.S. PATENT DOCUMENTS

| 5,201,802 | 4/1993 | Hirota | 60/277 |
| 5,211,010 | 5/1993 | Hirota | 60/284 |

FOREIGN PATENT DOCUMENTS

| 62-97630A | 5/1987 | Japan . |
| 62-106826A | 5/1987 | Japan . |
| 1568168 | 12/1989 | Japan . |
| 3135417 | 6/1991 | Japan . |
| 62-117620A | 5/2987 | Japan . |

OTHER PUBLICATIONS

J. Chem. Soc., Chem. Commun., 1990, pp. 1165–1166 "No Removal by Absorption into BaO–CuO Binary Oxides".

Journal of Solid State Chemistry 91, pp. 176–179 (1991) "Formation and Decomposition of BACuO$_{2.5}$ Prepared from a Mixture of Nitrates".

67th CATSJ Meeting Abstracts No. A9, vol. 33, No. 2, 1991, pp. 87–90 "No Removal by Absorption into Ba–Cu–O Binary Oxides".

*Primary Examiner*—Douglas Hart
*Attorney, Agent, or Firm*—Kenyon & Kenyon

[57] ABSTRACT

An engine comprising an exhaust passage having therein a NO$_x$ absorbent which absorbs the NO$_x$ when the air-fuel ratio of the exhaust gas flowing into the NO$_x$ absorbent is lean and releases the absorbed NO$_x$ when the air-fuel ratio of the exhaust gas flowing into the NO$_x$ absorbent becomes the stoichiometric air-fuel ratio or rich. A catalyst having an O$_2$ storage function is arranged in the exhaust passage downstream of the NO$_x$ absorbent. When NO$_x$ is to be released from the NO$_x$ absorbent, the air-fuel ratio of the exhaust gas is made rich to an extent such that the amount of unburned HC and CO is excessive beyond an amount necessary to reduce the whole NO$_x$.

11 Claims, 11 Drawing Sheets

EXHAUST GAS PURIFICATION DEVICE FOR AN ENGINE

BACKGROUND OF THE INVENTION

1. Field of the Invention

The present invention relates to an exhaust gas purification device for an engine.

2. Description of the Related Art

With respect to an engine in which a lean air-fuel mixture is burned, the same applicant has proposed a new type of engine in which a $NO_x$ absorbent is arranged in the exhaust passage of the engine. This $NO_x$ absorbent absorbs the $NO_x$ when the air-fuel ratio of the exhaust gas flowing into the $NO_x$ absorbent is lean, and this $NO_x$ absorbent releases the absorbed $NO_x$ when the air-fuel ratio of the exhaust gas flowing into the $NO_x$ absorbent becomes rich. In this engine, the $NO_x$ produced when the lean air-fuel mixture is burned is absorbed by the $NO_x$ absorbent. The air-fuel ratio of the exhaust gas flowing into the $NO_x$ absorbent is temporarily made rich before the absorbing ability of the $NO_x$ absorbent is saturated, and at this time, the $NO_x$ is released from the $NO_x$ absorbent. In addition, at this time, the $NO_x$ thus released is reduced (see copending U.S. patent application No. 66,100 derived from PCT application JP92/01279).

In this engine, for example, if the air-fuel mixture fed into the engine cylinder is made rich, a large amount of unburned HC and CO etc. are discharged from the engine. In addition, at this time, since the air-fuel ratio of the exhaust gas flowing into the $NO_x$ absorbent becomes rich, the $NO_x$ is released from the $NO_x$ absorbent. At this time, a part of unburned HC and CO etc. is used for reducing the $NO_x$ discharged from the engine, and the remaining $NO_x$ is used for reducing the $NO_x$ released from the $NO_x$ absorbent. Accordingly, in this case, to prevent the $NO_x$ from being discharged into the outside air, the amount of the exhaust gas discharged from the engine must be controlled so that it becomes equal to an amount which is necessary to reduce both the $NO_x$ discharged from the engine and the $NO_x$ released from the $NO_x$ absorbent.

However, it is difficult to control the amount of the exhaust gas discharged from the engine so that it becomes equal to the minimum amount necessary to reduce the whole $NO_x$, and actually, the amount of unburned HC and CO etc. becomes smaller or larger than the amount necessary to reduce the whole amount. In this case, a problem arises in that, if the amount of unburned HC and CO etc. becomes smaller than the amount necessary to reduce the whole $NO_x$, since the whole $NO_x$ is not reduced, the $NO_x$ is discharged into the outside air, and that, if the amount of unburned HC and CO etc. becomes larger than the amount necessary to reduce the whole $NO_x$, since the whole unburned HC and CO etc. is not oxidized, the unburned HC and CO etc. is discharged into the outside air.

SUMMARY OF THE INVENTION

An object of the present invention is to provide an exhaust gas purification device capable of preventing the unburned HC and CO etc. and the $NO_x$ from being discharged into the outside air when the releasing operation of $NO_x$ from the $NO_x$ absorbent is carried out.

According to the present invention, there is provided an exhaust gas purification device for an engine having an exhaust passage, the device comprising: an $NO_x$ absorbent arranged in the exhaust passage and absorbing $NO_x$ when the air-fuel ratio of the exhaust gas flowing into the $NO_x$ absorbent is lean, the $NO_x$ absorbent releasing absorbed $NO_x$ when the air-fuel ratio of exhaust gas becomes rich; air-fuel ratio control means for controlling the air-fuel ratio of exhaust gas to make the air-fuel ratio of exhaust gas lean when $NO_x$ is to be absorbed in the $NO_x$ absorbent, the air-fuel ratio control means changing over said air-fuel ratio of exhaust gas from a lean air-fuel ratio to a rich air-fuel ratio and increasing the richness of the exhaust gas flowing into the $NO_x$ absorbent to a predetermined richness in which the exhaust gas flowing into the $NO_x$ absorbent contains therein an excessive amount of unburned components relative to an amount necessary to reduce a whole $NO_x$ when $NO_x$ is to be released from the $NO_x$ absorbent; and unburned component oxidizing means for oxidizing the unburned components of the exhaust gas discharged from the $NO_x$ absorbent.

The present invention may be more fully understood from the description of preferred embodiments of the invention set forth below, together with the accompanying drawings.

DESCRIPTION OF PREFERRED EMBODIMENTS

Figure 1:
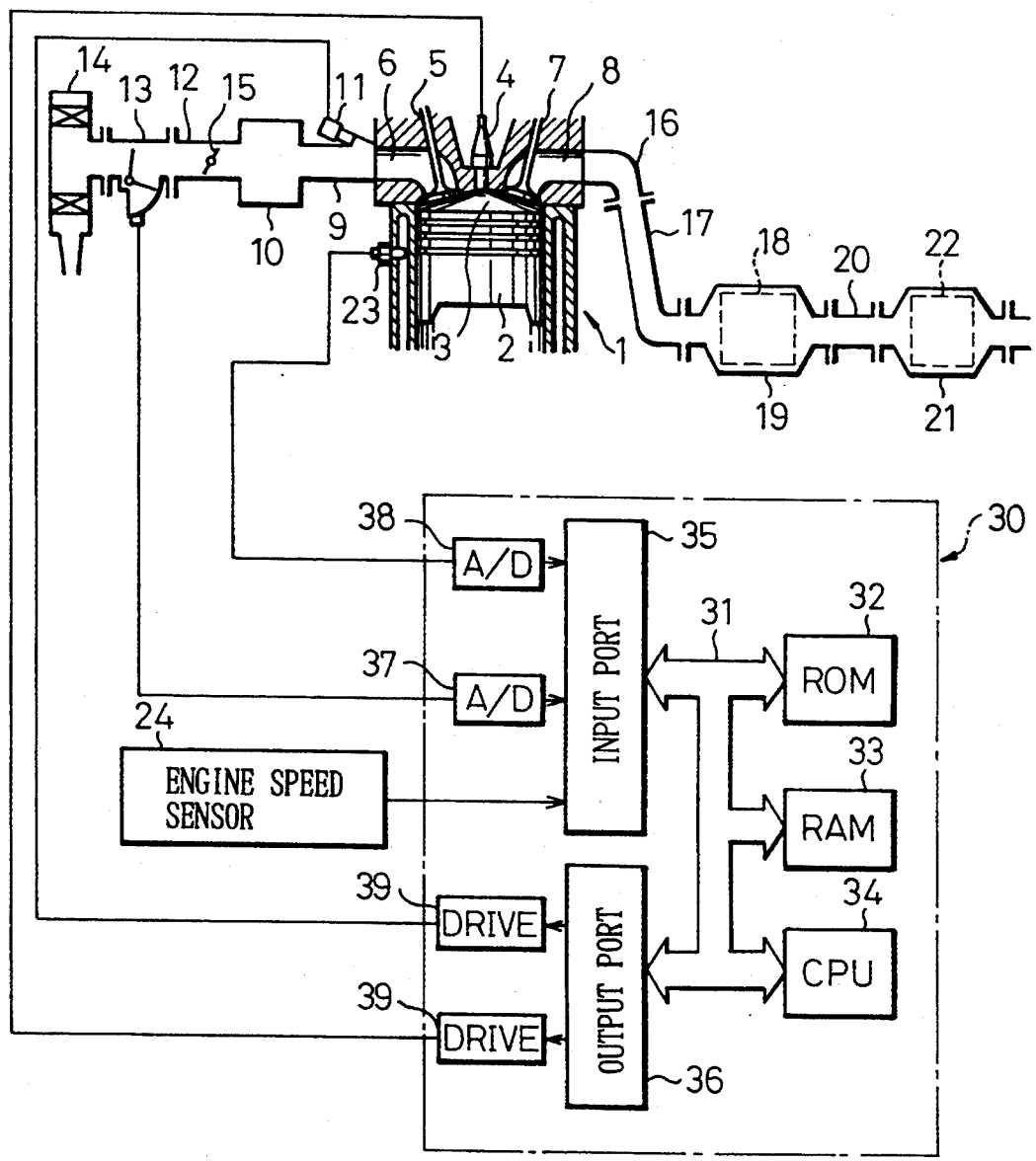
FIG. 1 is an overall view of an engine.

Referring to FIG. 1, reference numeral 1 designates an engine body, 2 a piston, 3 a combustion chamber, and 4 a spark plug; 5 designates an intake valve, 6 an intake port, 7 an exhaust valve, and 8 an exhaust port. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 14 via an intake duct 12 and an air flow meter 13, and a throttle valve 15 is disposed in the intake duct 12. The exhaust port 8 is connected via an exhaust manifold 16 and an exhaust pipe 17 to a casing 19 including an $NO_x$ absorbent 18, and the casing 19 is connected to a catalytic converter 21 via an exhaust pipe 20.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. The air flow meter 13 generates an output voltage proportional to the amount of intake air, and this output voltage is input via an AD converter 37 to the input port 35. A coolant temperature sensor 23 producing an output voltage which is proportional to the temperature of the engine cooling water is attached to the engine body 1, and the output voltage of the coolant temperature sensor 23 is input into the input port 35 via an AD converter 38. In addition, an engine speed sensor 24 generating an output pulse expressing the engine speed is connected to the input port 35. The output port 36 is connected via the corresponding driving circuits 39 to the spark plug 4 and fuel injector 11, respectively.

Figure 2:
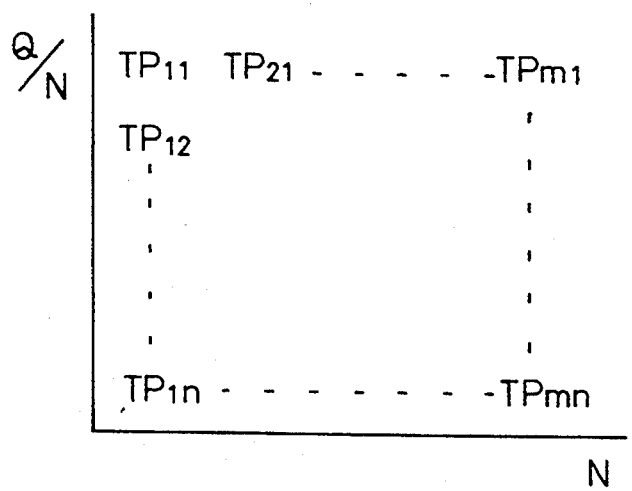
FIG. 2 is a view showing a map of a basic fuel injection time.

In the internal combustion engine shown in FIG. 1, the fuel injection time TAU is calculated based on for example the following equation.

$$TAU = TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiment and is stored in advance in the ROM 32 in the form of a map as shown in FIG. 2 as the function of an engine load Q/N (intake air amount Q/engine speed N) and the engine speed N. The correction coefficient K is a coefficient for controlling the air-fuel ratio of the air-fuel mixture fed into the engine cylinder, and if $K = 1.0$, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

In the engine illustrated in FIG. 1, the correction coefficient K is normally maintained at, for example, 0.6, that is, the air-fuel ratio of the air-fuel mixture fed into the engine cylinder is maintained at a lean air-fuel ratio. Accordingly, in the embodiment illustrated in FIG. 1, a lean air-fuel mixture is normally burned.

Figure 3:
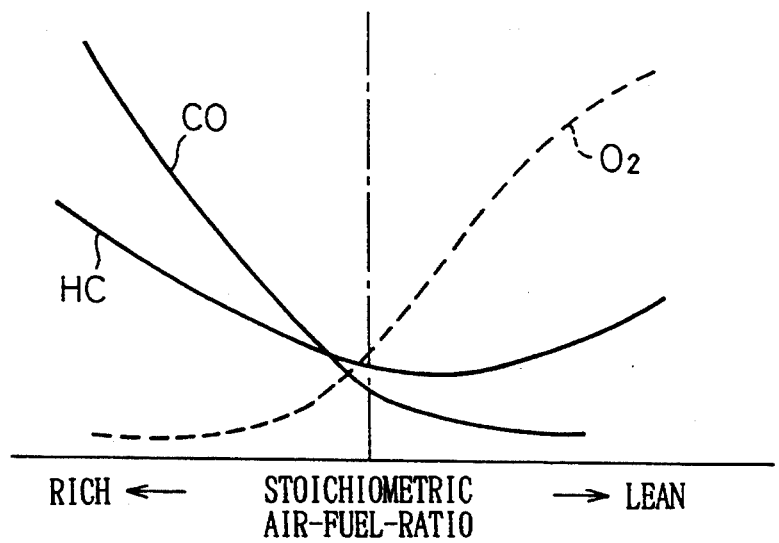
FIG. 3 is a diagram showing the concentration of unburned HC and CO and $O_2$ in the exhaust gas.

FIG. 3 schematically shows the concentration of representative components in the exhaust gas discharged from the combustion chamber 3. As seen from FIG. 3, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 18 contained in the casing 19 uses, for example, alumina as a carrier. On this carrier, at least one substance selected from alkali metals, for example, potassium K, sodium Na, lithium Li, and cesium Cs; alkali-earth metals, for example, barium Ba and calcium Ca; and rare-earth metals, for example, lanthanum La and yttrium Y and precious metals such as platinum Pt is carried. When referring to the ratio between the air and fuel (hydrocarbons) fed into the intake passage of the engine and the exhaust passage upstream of the $NO_x$ absorbent 18 as the air-fuel ratio of the inflowing exhaust gas to the $NO_x$ absorbent 18, this $NO_x$ absorbent 18 performs the absorption and releasing operation of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 18, the air-fuel ratio of the inflowing exhaust gas coincides with the air-fuel ratio of the air-fuel mixture fed into the combustion chamber 3, absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

Figure 4A:
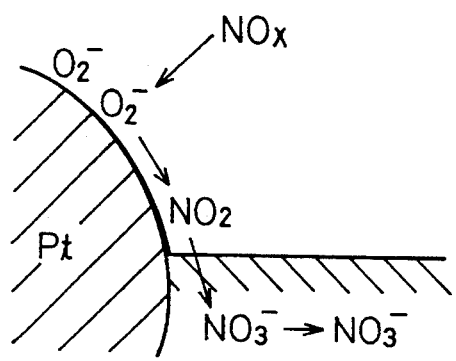
FIGS. 4A and 4B are views for explaining an absorbing and releasing operation of $NO_x$.
Figure 4B:
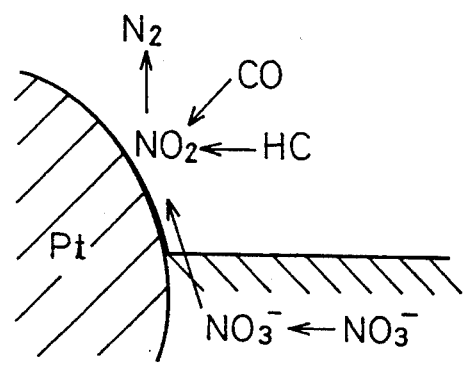

When the above-mentioned $NO_x$ absorbent 18 is disposed in the exhaust passage of the engine, this $NO_x$ absorbent 18 actually performs the absorption and releasing operation of $NO_x$, but there are areas of the exact mechanism of this absorption and releasing operation which are not clear. However, it can be considered that this absorption and releasing operation is conducted by the mechanism as shown in FIGS. 4A and 4B. This mechanism will be explained by using as an example a case where platinum Pt and barium Ba are carried on the carrier, but a similar mechanisms is obtained even if another precious metal, alkali metal, alkali earth metal, or rare earth metal is used.

Namely, when the inflowing exhaust gas becomes considerably lean, the concentration of oxygen in the inflowing exhaust gas is greatly increased. At this time, as shown in FIG. 4A, the oxygen $O_2$ is deposited on the surface of the platinum Pt in the form of $O_2^-$. The NO in the inflowing exhaust gas reacts with the $O_2^-$ on the surface of the platinum Pt and becomes $NO_2$ ($2NO + O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 4A. In this way, $NO_x$ is absorbed into the $NO_x$ absorbent 18.

So long as the oxygen concentration in the inflowing exhaust gas is high, the $NO_x$ is produced on the surface of the platinum Pt, and so long as the $NO_x$ absorption ability of the absorbent is not saturated, the $NO_x$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 18. As shown in FIG. 3, when the degree of leanness of the inflowing exhaust gas becomes low, the oxygen concentration in the inflowing exhaust gas is lowered, and accordingly when the degree of leanness of the inflowing exhaust gas is lowered, the $NO_x$ is released from the $NO_x$ absorbent 18 even if the air-fuel ratio of the inflowing exhaust gas is lean.

On the other hand, at this time, when the air-fuel ratio of the air-fuel mixture fed into the combustion chamber 3 is made rich and the air-fuel ratio of the inflowing exhaust gas becomes rich, as shown in FIG. 3, a large amount of unburnt HC and CO is discharged from the engine, and this unburnt HC and CO react with the oxygen $O_2^-$ on the platinum Pt and are oxidized. Also, when the air-fuel ratio of the inflowing exhaust gas becomes rich, the oxygen concentration in the inflowing exhaust gas is lowered considerably, and therefore the $NO_2$ is released from the absorbent. This $NO_2$ reacts with the unburnt HC and CO as shown in FIG. 4B and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 18 in a short time.

Namely, when the air-fuel ratio of the inflowing exhaust gas is made rich, first of all, the unburnt C and CO immediately react with the $O_2^-$ on the platinum Pt and are oxidized, and subsequently if the unburnt C and CO still remain even though the $O_2^-$ on the platinum Pt is consumed, the $NO_x$ released from the absorbent and the $NO_x$ discharged from the engine are reduced by these unburnt HC and CO. Accordingly, to reduce both the whole $NO_x$ released from the $NO_x$ absorbent 18 and the whole $NO_x$ discharged from the engine when the air-fuel ratio of the inflowing exhaust gas is made rich, it is necessary to control the richness of the air-fuel ratio of the inflowing exhaust gas so that the amount of the unburned HC and CO flowing into the $NO_x$ absorbent 18 becomes at least an amount necessary to consume the oxygen $O_2^-$ on the platinum Pt and reduce the whole $NO_x$.

Figure 5:
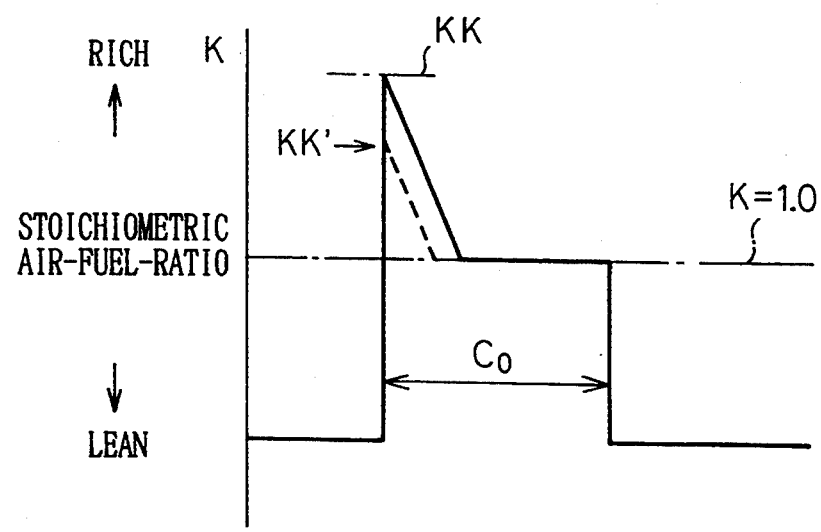
FIG. 5 is a diagram illustrating a change in the correction coefficient.

FIG. 5 illustrates a rich control of the air-fuel ratio of the inflowing exhaust gas, which is used in the embodiment according to the present invention. In the embodiment illustrated in FIG. 5, when the $NO_x$ is to be released from the $NO_x$ absorbent 18, the air-fuel ratio of the air-fuel mixture fed into the engine cylinder is made rich by increasing the value of the correction coefficient K, which is used for calculating the earlier mentioned fuel injection time TAU, up to KK ($>1.0$). Then, the correction coefficient K is gradually reduced and then, the correction coefficient K is maintained at 1.0, i.e., the air-fuel ratio of the air-fuel mixture fed into the combustion chamber 3 is maintained at the stoichiometric air-fuel ratio. When a time $C_o$ has elapsed after the rich control is started, the correction coefficient K is made less than 1.0 again and thus, the burning of the lean air-fuel mixture is started again.

When the air-fuel ratio of the air-fuel mixture fed into the combustion chamber 3 becomes rich (K=KK), a large part of the $NO_x$ absorbed in the $NO_x$ absorbent 18 is abruptly released. The value of the correction coefficient KK is determined so that the amount of the unburned HC and CO produced at this time becomes an excessive amount which is larger than an amount necessary to consume the oxygen $O_2$ on the platinum Pt and reduce the whole $NO_x$.

Namely, the broken line in FIG. 5 indicates the correction coefficient KK' in which the amount of the unburned HC and CO discharged from the engine when the rich operation is started becomes an amount exactly necessary to consume the oxygen $O_2$ on the platinum Pt and reduce the whole $NO_x$, and the correction coefficient KK is determined so that it becomes larger than the correction coefficient KK'.

In addition, in this case, the amount of $NO_x$ released from the $NO_x$ absorbent 18 is increased as the temperature of the exhaust gas becomes high and thus, the temperature of the $NO_x$ absorbent 18 becomes high. Accordingly, as illustrated by the solid line in FIG. 6A, the correction coefficient KK becomes large as the temperature of the exhaust gas T becomes high. Note that, in FIG. 6A, the correction coefficient KK' in which the amount of the unburned HC and CO becomes equal to an amount exactly necessary to consume the oxygen $O_2$ on the platinum Pt and reduce the whole $NO_x$ is indicated by the broken line as a reference.

Figures 6A, 6B:
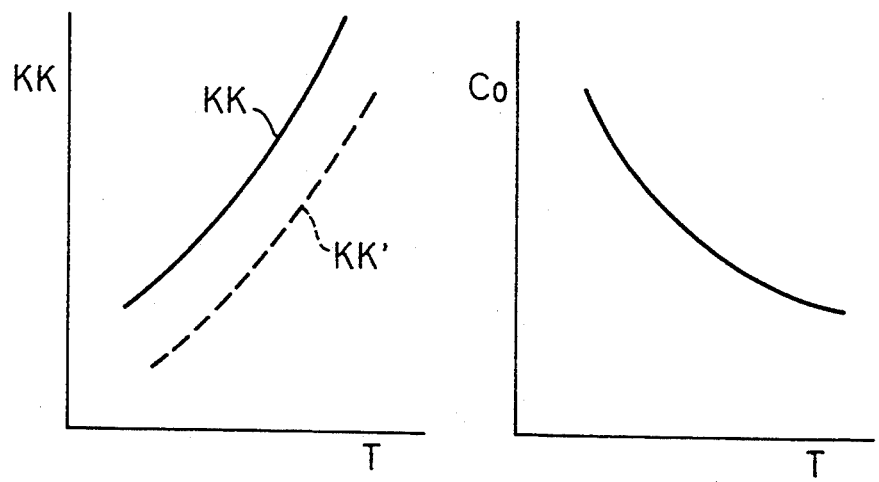
FIGS. 6A and 6B are views illustrating changes in the correction coefficient KK and the time $C_o$.
Figure 7:
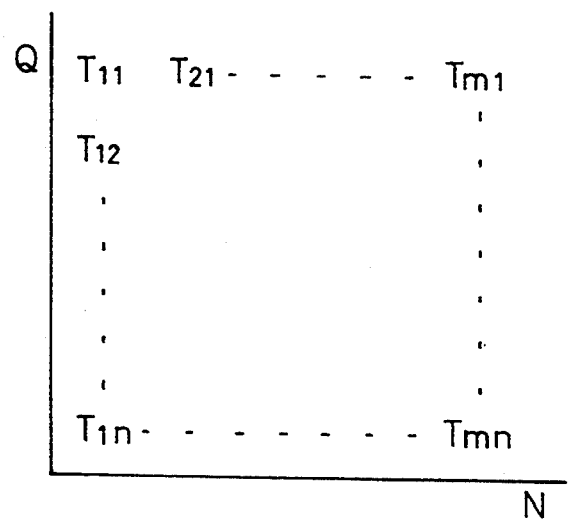
FIG. 7 is a view showing a map of the temperature of the exhaust gas.

The relationship between the correction coefficient KK and the temperature T of the exhaust gas, illustrated in FIG. 6A, is stored in advance in the ROM 32. In this case, although the temperature T of the exhaust gas can be directly detected, this temperature T of the exhaust gas can be estimated from the amount of intake air Q and the engine speed N. Therefore, in the embodiment according to the present invention, the relationship between the temperature T of the exhaust gas, the amount of intake air Q and the engine speed N is found in advance by experiments and stored in the ROM 32 in the form of a map as illustrated in FIG. 7, and the temperature T of the exhaust gas is calculated from this map.

As mentioned earlier, when the air-fuel ratio of the air-fuel mixture fed into the combustion chamber 3 is made rich (K=KK), a large part of the $NO_x$ absorbed in the $NO_x$ absorbent 18 is rapidly released and, even if the air-fuel ratio of the air-fuel mixture is maintained at a rich air-fuel ratio thereafter, only the small amount of the $NO_x$ is released little by little from the $NO_x$ absorbent 18. Accordingly, if the air-fuel ratio of he air-fuel mixture continues to be maintained at a rich air-fuel ratio, the unburned HC and CO are discharged into the outside air. Therefore, in the embodiment according to the present invention, as illustrated in FIG. 5, the richness of the air-fuel ratio of the air-fuel mixture is gradually lowered after the air-fuel ratio of the air-fuel mixture is made rich (K=KK). Then, the air-fuel ratio of the air-fuel mixture is maintained at the stoichiometric air-fuel ratio to successively reduce the $NO_x$ which is released little by little from the $NO_x$ absorbent 18.

Note that the amount of the $NO_x$ released from the $NO_x$ absorbent 18 after the air-fuel ratio of the air-fuel mixture is made rich becomes smaller as the amount of the $NO_x$ released from the $NO_x$ absorbent 18 becomes larger when the air-fuel ratio of the air-fuel mixture is made rich. Accordingly, the time taken by the $NO_x$ absorbent 18 to release all the $NO_x$ becomes shorter as the amount of the $NO_x$ released from the $NO_x$ absorbent 18 becomes larger when the air-fuel ratio of the air-fuel mixture is made rich. In this case, as mentioned earlier, the amount of the $NO_x$ released from the $NO_x$ absorbent 18 becomes larger as the temperature T of the exhaust gas becomes high. Accordingly, as illustrated in FIG. 6B, the time Co from when the air-fuel ratio of the air-fuel mixture is made rich to when it is returned to a lean air-fuel ratio again is made shorter as the temperature T of the exhaust gas becomes high. The relationship between the time Co and the temperature T of the exhaust gas, illustrated is FIG. 6B, is stored in advance in the ROM 32.

When the correction coefficient K has risen to KK as illustrated in FIG. 5, an excessive amount of the $NO_x$, which is larger than an amount necessary to consume the oxygen $O_2$ on the platinum Pt and reduce all the NO$_x$, flows into the NO$_x$ absorbent 18, and thus the NO$_x$ is properly reduced. However, at this time, an excess of unburned HC and CO is discharged from the NO$_x$ absorbent 18, and accordingly, it is necessary to oxidize this excess unburned HC and CO. To this end, in the embodiment according to the present invention, the catalytic converter 21 containing therein the catalyst 22 which has an O$_2$ storage function is arranged in the exhaust passage downstream of the NO$_x$ absorbent 18 to oxidize the excess unburned HC and CO.

Namely, the catalyst 22 uses, for example, alumina as a carrier, and on this carrier, precious metals such as platinum Pt, alkali-earth metals such as calcium Ca, and cerium Ce are carried. If cerium Ce is carried on the carrier, the catalyst 22 has an O$_2$ storage function such that the catalyst 22 absorbs and stores the oxygen O$_2$ contained in the exhaust gas when the air-fuel ratio of the exhaust gas flowing into the catalyst 22 is lean, and the unburned HC and CO takes away the oxygen O$_2$ stored in the catalyst 22 when the air-fuel ratio of the exhaust gas flowing into the NO$_x$ absorbent 18 becomes rich.

Accordingly, if the catalyst 22 having such an O$_2$ storage function is arranged in the exhaust passage downstream of the NO$_x$ absorbent 18, a large amount of oxygen O$_2$ is absorbed and stored in the catalyst 22 during the time a lean air-fuel mixture is burned. Accordingly, when the air-fuel ratio of the air-fuel mixture fed into the combustion chamber 3 is made rich to release the NO$_x$ from the NO$_x$ absorbent 18, even if the unburned HC and CO is discharged from the NO$_x$ absorbent 18, the unburned HC and CO is oxidized by the oxygen O$_2$ stored in the NO$_x$ absorbent 18. Accordingly, the discharge of the unburned HC and CO into the outside air is prevented.

Next, a first embodiment of a NO$_x$ absorbing and releasing control for the NO$_x$ absorbent 18 will be described with reference to FIGS. 8A, 8B and 9.

Figure 8A:
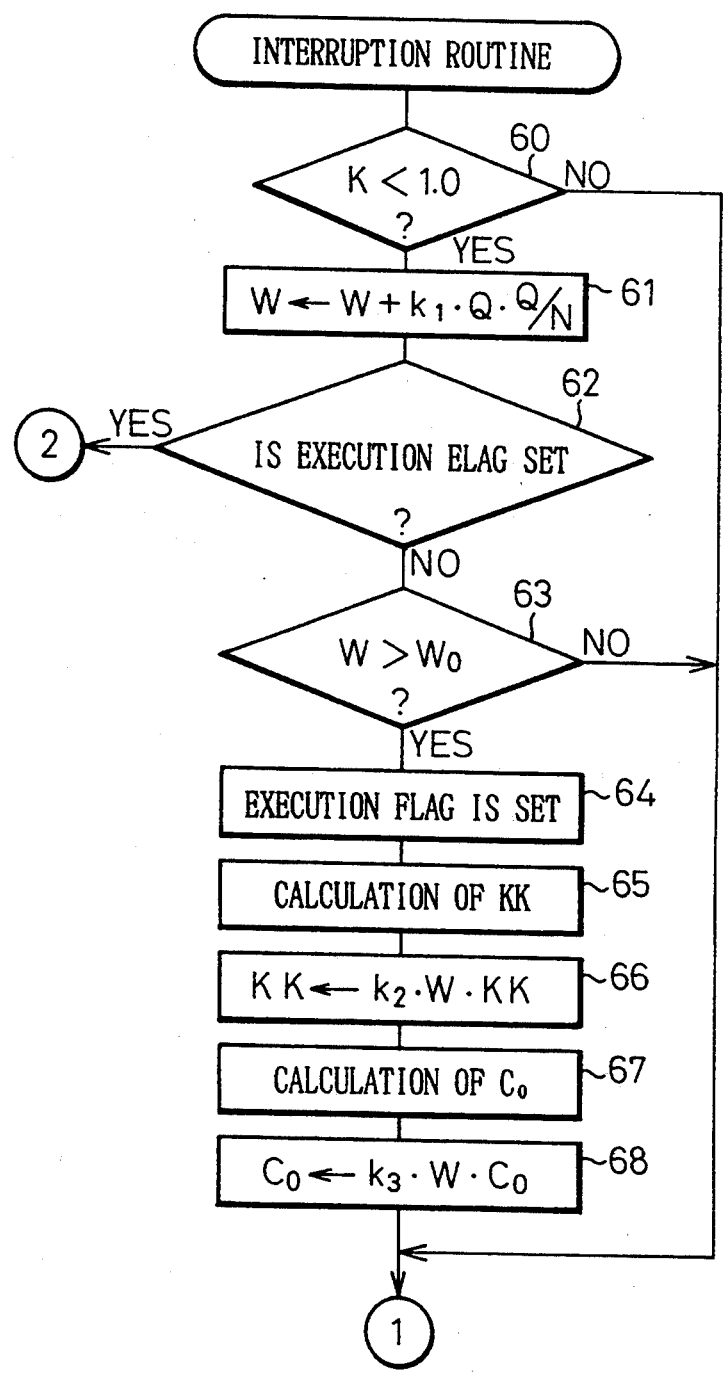
FIGS. 8A and 8B are a flow chart of an interruption routine.
Figure 8B:
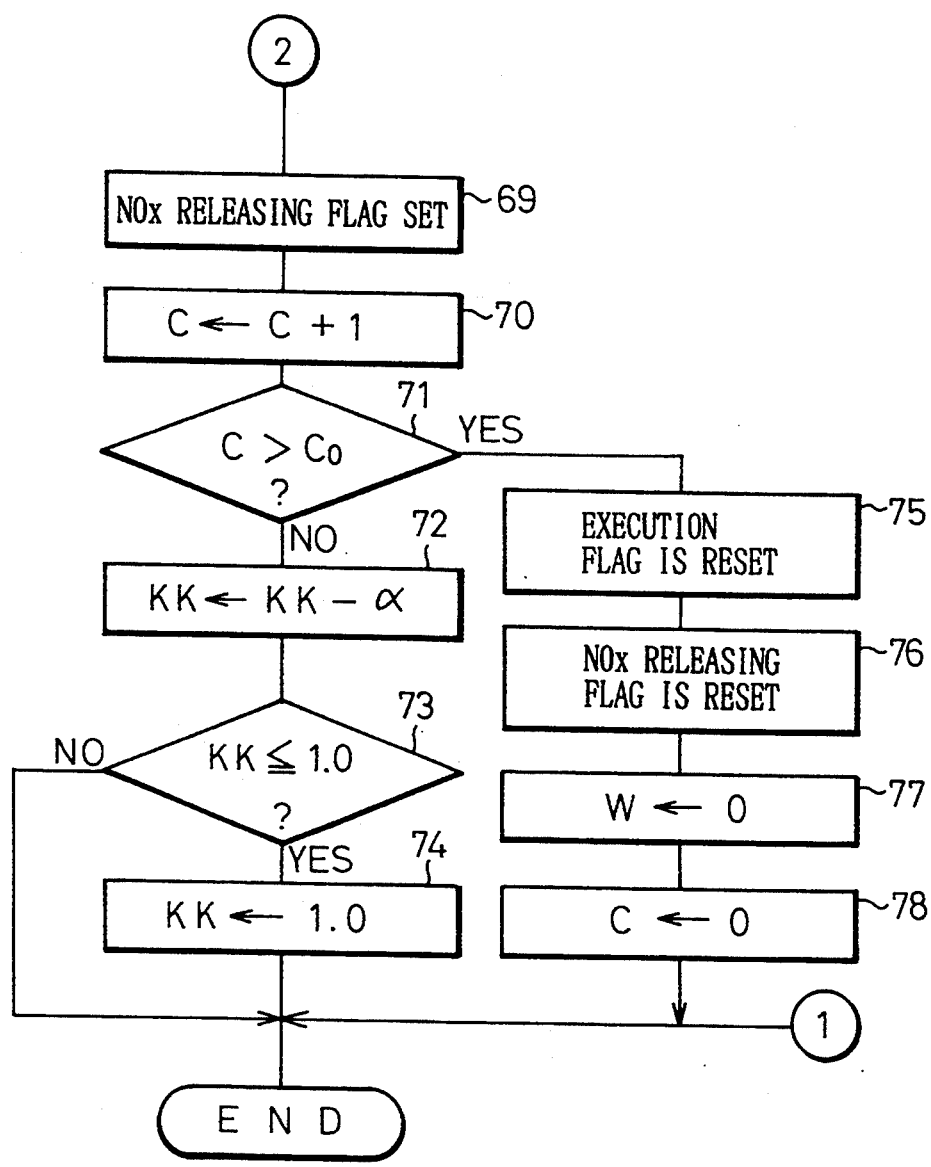

FIGS. 8A and 8B illustrate an interruption routine which is executed at predetermined time intervals.

Referring to FIGS. 8A and 8B, in step 60, it is determined whether or not the correction coefficient K is smaller than 1.0, i.e., the operating state of the engine is a state where a lean air-fuel mixture is to be burned. If $K \geq 1.0$, i.e., when the operating state of the engine is a state where the air-fuel ratio of the air-fuel mixture fed into the combustion chamber 3 is the stoichiometric air fuel ratio or a rich air-fuel ratio, the processing cycle is completed. Conversely, if $K<1.0$, i.e., when the operating state of the engine is a state where a lean air-fuel mixture is to be burned, the routine goes to step 61, and the amount of NO$_x$ W stored in the NO$_x$ absorbent 18 is calculated. Namely, the amount of the NO$_x$ discharged from the engine is increased as the amount of intake air Q becomes larger, and the amount of the NO$_x$ discharged from the engine is increased as the engine load Q/N becomes high. Accordingly, the amount of NO$_x$ W stored in the NO$_x$ absorbent 18 is represented by the sum of W and $K_1 \cdot Q \cdot Q/N$ ($K_1$ is a constant).

Then, in step 62, it is determined whether or not the execution flag is set. When the execution flag is not set, the routine goes to step 63, and it is determined whether or not the amount of NO$_x$ stored in the NO$_x$ absorbent 18 becomes larger than a predetermined amount W$_o$. This predetermined amount W$_o$ is about 30 percent of the maximum amount of NO$_x$ which the NO$_x$ absorbent 18 is able to absorb. If $W \leq W_o$, the processing cycle is completed and, if $W>W_o$, the routine goes to step 64, and the execution flag is set. Accordingly, when W exceeds W$_o$, the execution flag is set.

If the execution flag is set, the routine goes to step 65, and the correction coefficient KK is calculated based on the relationship shown in FIG. 6A and the map shown in FIG. 7. Then, in step 66, the final correction coefficient KK is calculated by multiplying KK by $k_2 \cdot W$ ($k_2$ is a constant). Namely, the richness of the air-fuel ratio (KK) is reduced as the amount of NO$_x$ W stored in the NO$_x$ absorbent 18 falls. Then, in step 67, the time C$_o$ is calculated based on the relationship shown in FIG. 6B and the map shown in FIG. 7. Then, in step 68, the final time Co is calculated by multiplying Co by $k_3 \cdot W$ ($k_3$ is a constant). Namely, the time Co is made shorter as the amount of NO$_x$ W stored in the NO$_x$ absorbent 18 falls. Then, the processing cycle is completed.

If the execution flag is set, in the next processing cycle, the routine goes to step 69 of FIG. 8B from step 62 of FIG. 8A, and the NO$_x$ releasing flag is set. Then, in step 70, the count value C is incremented by one. Then, in step 71, it is determined whether or not the count value C becomes larger than the time C$_o$, i.e., the time C$_o$ has elapsed after the rich control is started. If $C \leq C_o$, the routine goes to step 72, and a fixed value X is subtracted from the correction coefficient KK. Then, in step 73, it is determined whether or not the correction coefficient KK has become less than 1.0. When KK becomes less than 1.0, the routine goes to step 74, and KK is made 1.0. Accordingly, as illustrated in FIG. 5, the correction coefficient KK is gradually reduced and when KK becomes equal to 1.0, KK is maintained at 1.0 thereafter.

After this, if C exceeds Co, the routine goes to step 75 from step 71, and the execution flag is reset. Then, in step 76, the NO$_x$ releasing flag is reset. Then, in step 77, the amount of NO$_x$ W stored in the NO$_x$ absorbent 18 is made zero, and then in step 78, the count value C is made zero.

Figure 9:
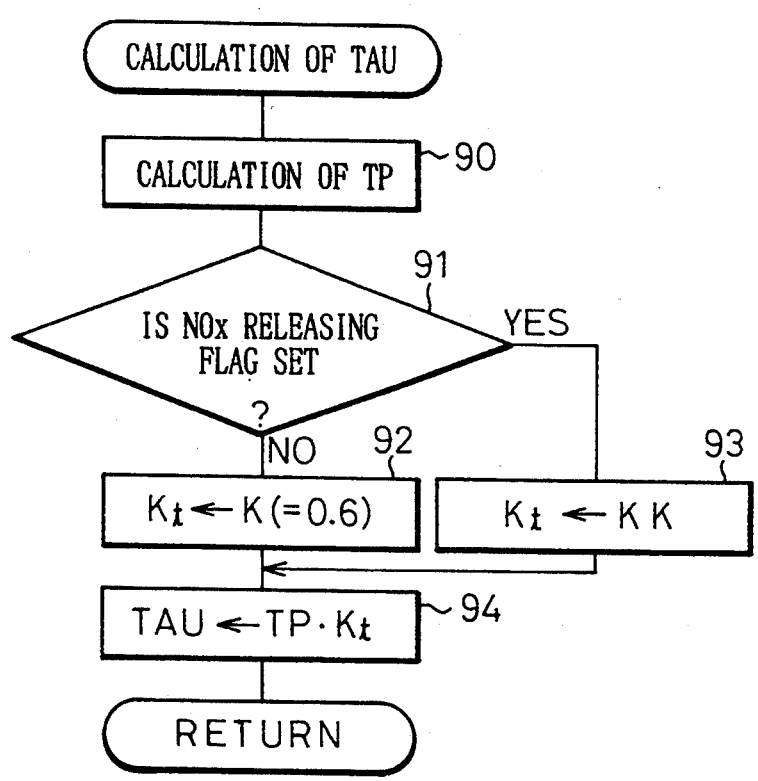
FIG. 9 is a flow chart for calculating the fuel injection time TAU.

FIG. 9 illustrates a routine for calculating the fuel injection time TAU, and this routine is repeatedly executed.

Referring to FIG. 9, in step 90, the basic fuel injection time TP is calculated from the map shown in FIG. 2. Then, in step 91, it is determined whether or not the NO$_x$ releasing flag is set. When the NO$_x$ releasing flag is not set, the routine goes to step 92, and the correction coefficient K (K is for example 0.6) is made K$_t$. Then, in step 94, the fuel injection time TAU is calculated by multiplying the basic fuel injection time TP by the correction coefficient K$_t$. At this time, normally, a lean air-fuel mixture is burned.

When it is determined in step 91 that the NO$_x$ releasing flag is set, the routine goes to step 93, and the value of the correction coefficient KK, which is calculated in the routine shown in FIGS. 8A and 8B, is stored as the value of K$_t$. Then, the routine goes to step 94. Accordingly, at this time, the air-fuel ratio of the air-fuel mixture fed into the combustion chamber 3 is temporarily made rich and then is maintained at the stoichiometric air-fuel ratio for a short time.

Figure 10:
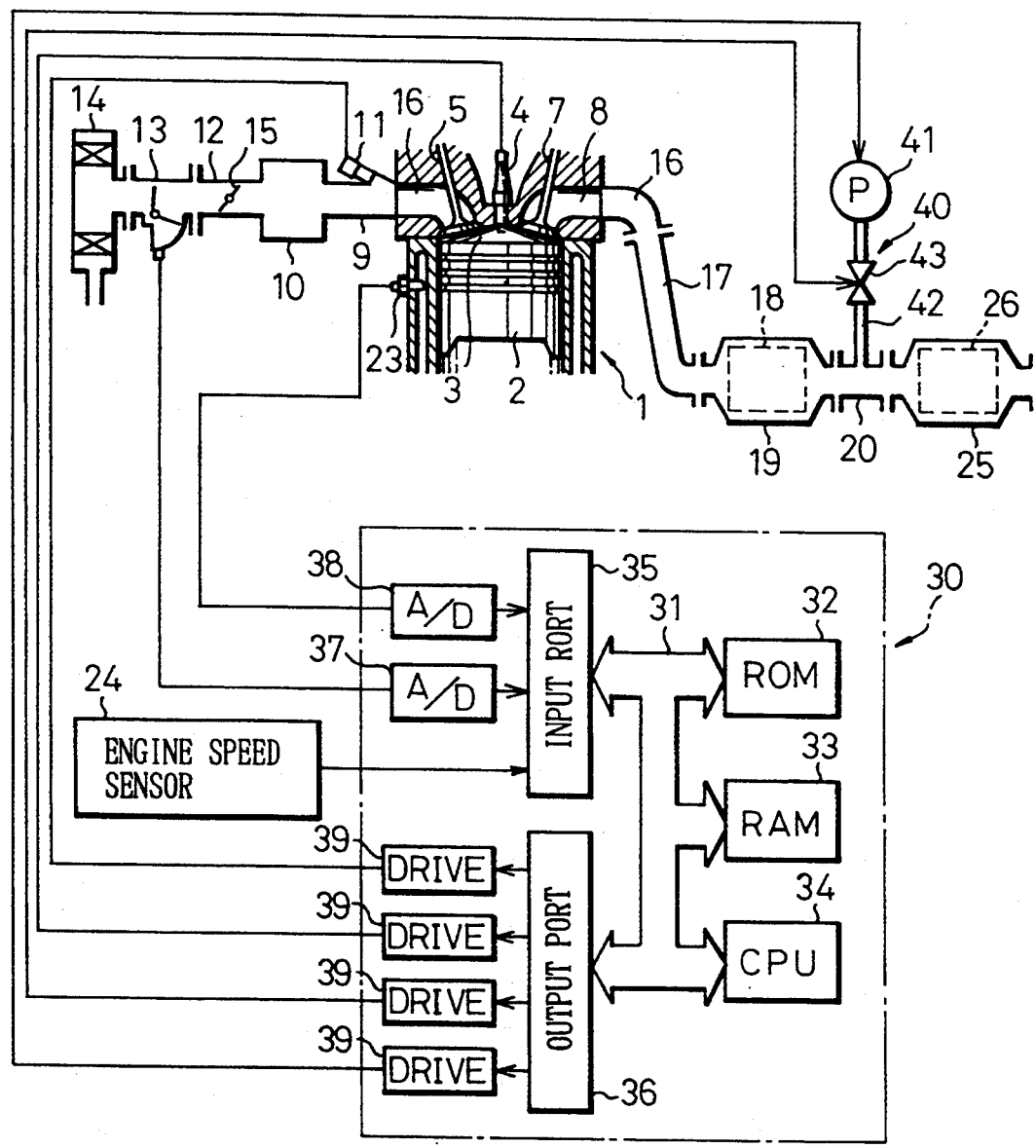
FIG. 10 is an overall view of another embodiment of an engine.

FIG. 10 illustrates a second embodiment. In this second embodiment, similar components are indicated with the same reference numerals used in FIG. 1.

Referring to FIG. 10, in this embodiment, the casing 19 of the NO$_x$ absorbent 18 is connected via the exhaust pipe 20 to a catalytic converter 25 including an oxidizing catalyst 26 therein, and a secondary air supply device 40 for feeding secondary air into the exhaust pipe 20 is provided. In the embodiment shown in FIG. 10, this secondary air supply device 40 comprises an electrically operated air pump 41, a secondary air supply conduit 42 for feeding secondary air, discharged from the air pump 41, into the exhaust pipe 20, and a solenoid valve 43 for controlling the supply of secondary air, and the output port 36 of the electronic control unit 30 is connected to the air pump 41 and the solenoid valve 43 via the corresponding drive circuits 39.

Also in this second embodiment, when the $NO_x$ is to be released from the $NO_x$ absorbent 18, the correction coefficient K increases to KK shown in FIG. 5, and thus, excess unburned HC and CO is discharged from the $NO_x$ absorbent 18. In the second embodiment, to oxidize the excess unburned HC and CO, secondary air is fed into the exhaust pipe 20 from the secondary air supply device 40 during the time KK is larger than 1.0, i.e., a rich air-fuel mixture is burned. In this case, to promote the oxidation of the unburned HC and CO, it is preferable that the oxidizing catalyst 26 be arranged downstream of the exhaust pipe 20, as illustrated in FIG. 10.

Next, a second embodiment of a $NO_x$ absorbing and releasing control for the $NO_x$ absorbent 18 will be described with reference to FIGS. 11A, 11B and 12.

Figure 11A:
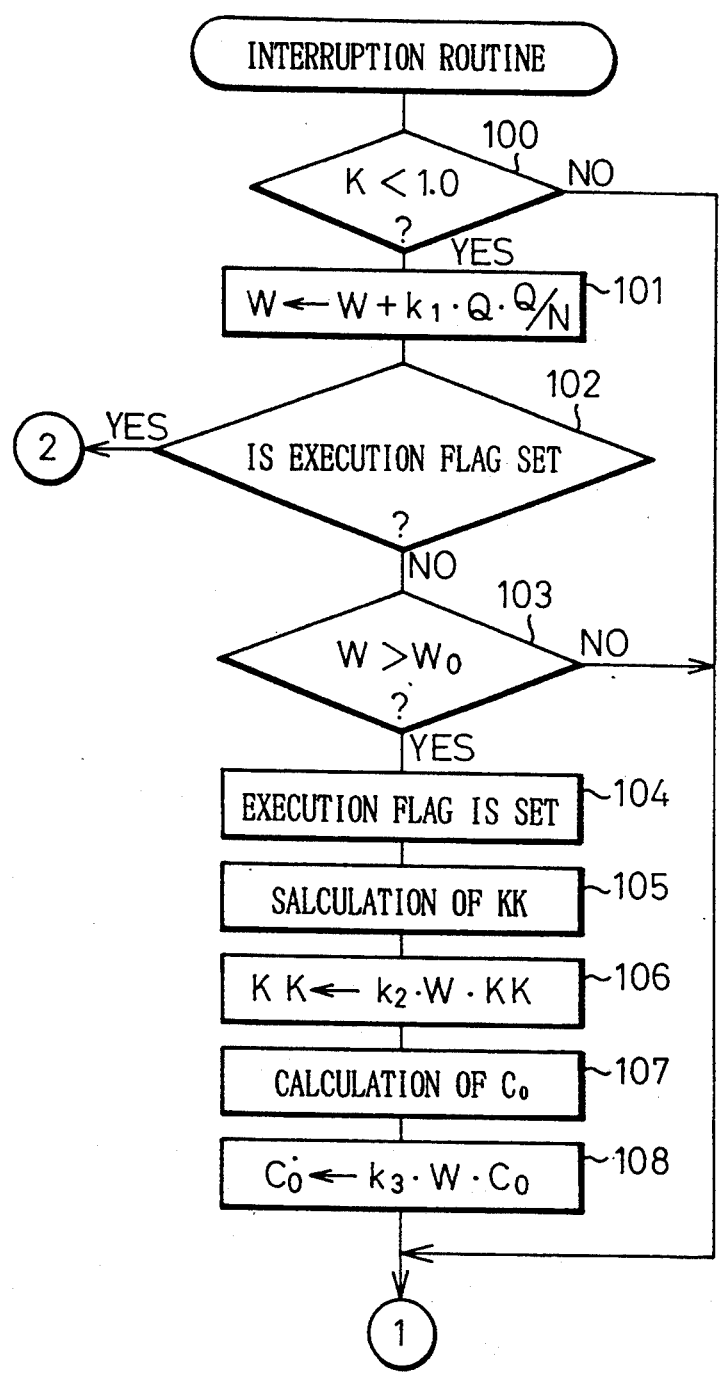
FIGS. 11A and 11B are a flow chart of an interruption routine.
Figure 11B:
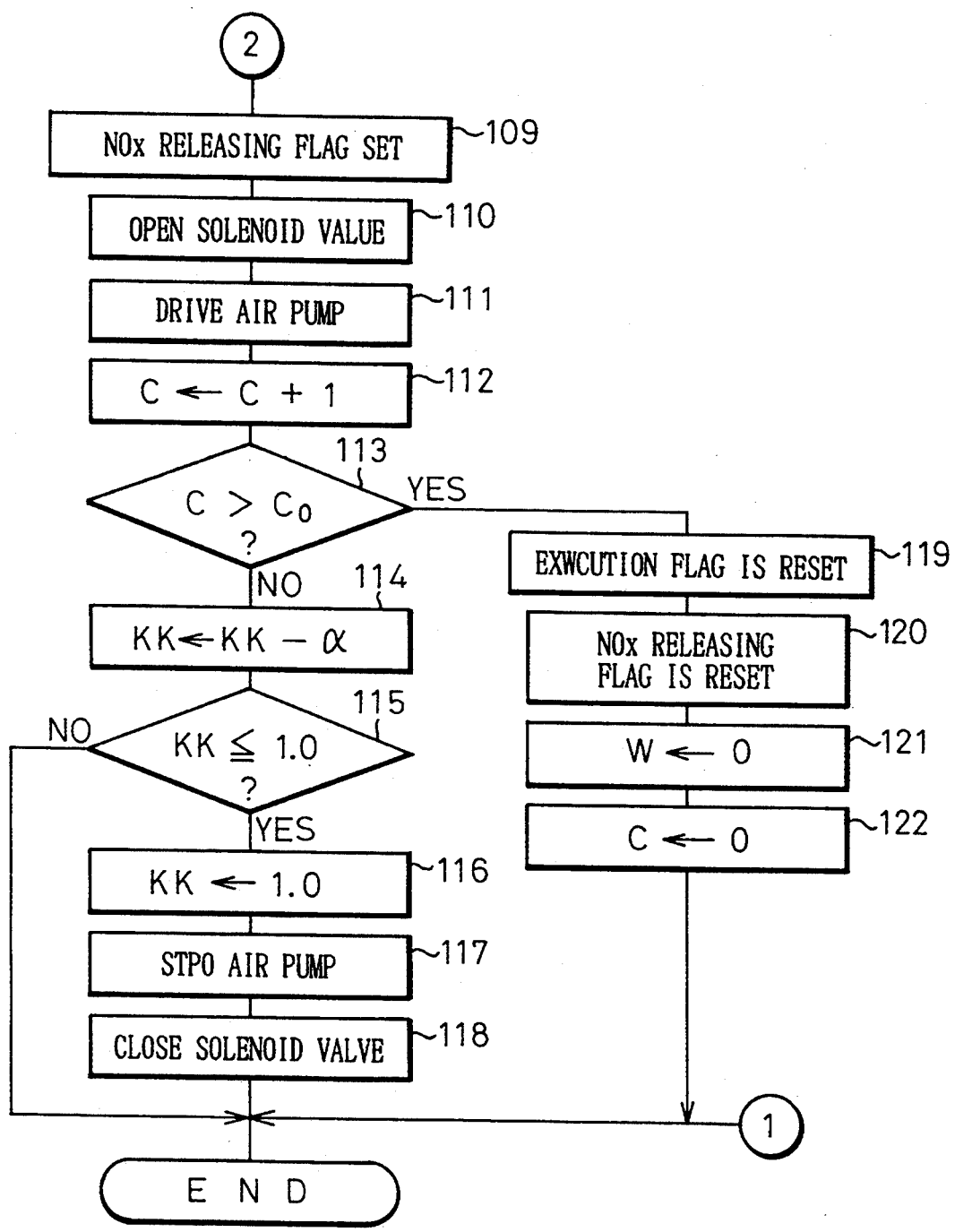

FIGS. 11A and 11B illustrate an interruption routine which is executed at predetermined time intervals.

Referring to FIGS. 11A and 11B, in step 100, it is determined whether or not the correction coefficient K is smaller than 1.0, i.e., the operating state of the engine is a state where a lean air-fuel mixture is to be burned. If $K \geq 1.0$, i.e., when the operating state of the engine is a state where the air-fuel ratio of the air-fuel mixture fed into the combustion chamber 3 is the stoichiometric or rich air-fuel ratio, the processing cycle is completed. Conversely, if $K < 1.0$, i.e., when the operating state of the engine is a state where a lean air-fuel mixture is to be burned, the routine goes to step 101, and the amount of $NO_x$ W stored in the $NO_x$ absorbent 18 is calculated. Namely, as mentioned earlier, the amount of the $NO_x$ discharged from the engine is increased as the amount of intake air Q becomes larger, and the amount of the $NO_x$ discharged from the engine is increased as the engine load Q/N becomes high. Accordingly, the amount of $NO_x$ W stored in the $NO_x$ absorbent 18 is represented by the sum of W and $K_1 \cdot Q \cdot Q/N$ ($K_1$ is a constant).

Then, in step 102, it is determined whether or not the execution flag is set. When the execution flag is not set, the routine goes to step 103, and it is determined whether or not the amount of $NO_x$ stored in the $NO_x$ absorbent 18 becomes larger than a predetermined amount $W_o$. This predetermined amount $W_o$ is about 30 percent of the maximum amount of $NO_x$ which the $NO_x$ absorbent 18 is able to absorb. If $W \leq W_o$, the processing cycle is completed and, if $W > W_o$, the routine goes to step 104, and the execution flag is set. Accordingly, when W exceeds Wo, the execution flag is set.

If the execution flag is set, the routine goes to step 105, and the correction coefficient KK is calculated based on the relationship shown in FIG. 6A and the map shown in FIG. 7. Then, in step 106, the final correction coefficient KK is calculated by multiplying KK by $k_2 \cdot W$ ($k_2$ is a constant). Namely, the richness of the air-fuel ratio (KK) is reduced as the amount of $NO_x$ W stored in the $NO_x$ absorbent 18 falls. Then, in step 107, the time $C_o$ is calculated based on the relationship shown in FIG. 6B and the map shown in FIG. 7. Then, in step 108, the final time $C_o$ is calculated by multiplying $C_o$ by $k_3 \cdot W$ ($k_3$ is a constant). Namely, the time $C_o$ is made shorter as the amount of $NO_x$ W stored in the $NO_x$ absorbent 18 falls. Then, the processing cycle is completed.

If the execution flag is set, in the next processing cycle, the routine goes to step 109 of FIG. 11B from step 102 of FIG. 11A, and the $NO_x$ releasing flag is set. Then, in step 110, the solenoid valve 43 is caused to open, and then in step 111, the air pump 41 is driven. Accordingly the supply of secondary air into the exhaust pipe 20 is started. Then in step 112, the count value C is incremented by one. Then, in step 113, it is determined whether or not the count value C becomes larger than the time $C_o$, i.e., the time $C_o$ has elapsed after the rich control is started. If $C \leq C_o$, the routine goes to step 114, and a fixed value X is subtracted from the correction coefficient KK. Then, in step 115, it is determined whether or not the correction coefficient KK becomes lower than 1.0. When KK becomes lower than 1.0, the routine goes to step 116, and KK is made 1.0. Then, in step 117, the air pump 41 is stopped, and then in step 118, the solenoid valve 43 is closed. Accordingly, as illustrated in FIG. 5, the correction coefficient KK is gradually becomes small and when KK becomes equal to 1.0, the supply of secondary air into the exhaust pipe 20 is stopped. KK is maintained at 1.0 thereafter.

After this, if C exceeds Co, the routine goes to step 119 from step 113, and the execution flag is reset. Then, in step 120, the $NO_x$ releasing flag is reset. Then, in step 121, the amount of $NO_x$ W stored in the $NO_x$ absorbent 18 is made zero, and then in step 122, the count value C is made zero.

Figure 12:
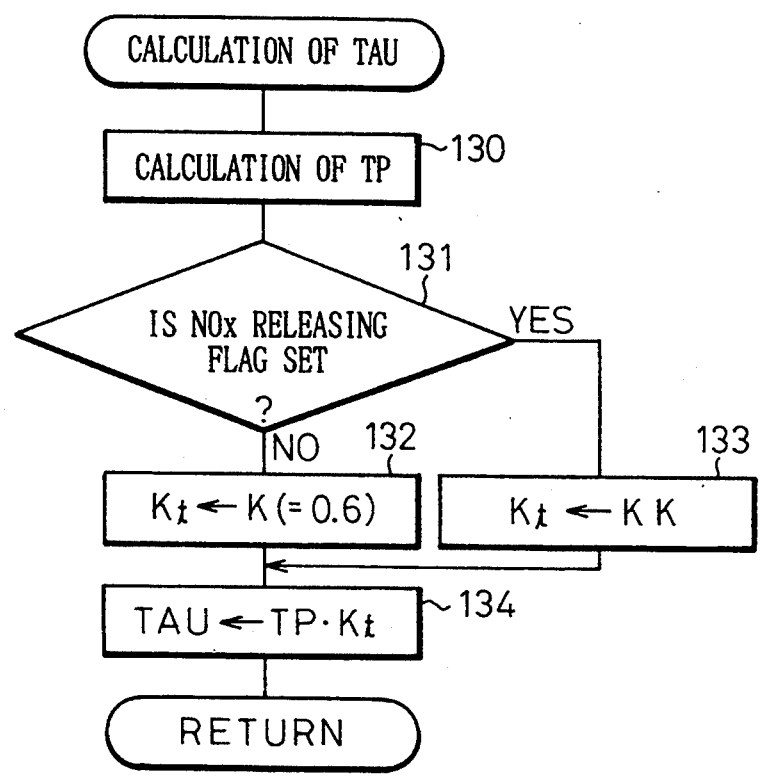
FIG. 12 is a flow chart for calculating the fuel injection time TAU.

FIG. 12 illustrates a routine for calculating the fuel injection time TAU, and this routine is repeatedly executed.

Referring to FIG. 12, in step 130, the basic fuel injection time TP is calculated from the map shown in FIG. 2. Then, in step 131, it is determined whether or not the $NO_x$ releasing flag is set. When the $NO_x$ releasing flag is not set, the routine goes to step 132, and the correction coefficient K (K is for example 0.6) is made $K_t$. Then, in step 134, the fuel injection time TAU is calculated by multiplying the basic fuel injection time TP by the correction coefficient $K_t$. At this time, normally, a lean air-fuel mixture is burned.

When it is determined in step 131 that the $NO_x$ releasing flag is set, the routine goes to step 133, and the correction coefficient KK which is being calculated in the routine shown in FIGS. 11A and 11b is made $K_t$. Then, the routine goes to step 134. Accordingly, at this time, the air-fuel ratio of the air-fuel mixture fed into the combustion chamber 3 is temporarily made rich and then is maintained at the stoichiometric air-fuel ratio for a short time.

According to the present invention, when the $NO_x$ is released from the $NO_x$ absorbent, it is possible to properly reduce the $NO_x$ and oxidize the unburned HC and CO. Accordingly, it is possible to prevent the $NO_x$ and unburned HC and CO from being discharged into the outside air.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purification device for an engine having an exhaust passage, said device comprising:

an $NO_x$ absorbent arranged in the exhaust passage and absorbing $NO_x$ when an air-fuel ratio of exhaust gas flowing into the $NO_x$ absorbent is lean, said $NO_x$ absorbent releasing absorbed $NO_x$ when said air-fuel ratio of exhaust gas becomes rich;

an air-fuel ratio control means for controlling said air-fuel ratio of exhaust gas to make said air-fuel ratio of exhaust gas lean when $NO_x$ is to be absorbed in said $NO_x$ absorbent, said air-fuel ratio control means changing over said air-fuel ratio of exhaust gas from a lean air-fuel ratio to a rich air-fuel ratio and increasing a richness of exhaust gas flowing into said $NO_x$ absorbent to a predetermined richness in which the exhaust gas flowing into said $NO_x$ absorbent contains therein an excessive amount of unburned components relative to an amount necessary to reduce all of the $NO_x$ when $NO_x$ is to be released from said $NO_x$ absorbent; and unburned component oxidizing means for oxidizing the unburned components of the exhaust gas discharged from said $NO_x$ absorbent.

2. An exhaust gas purification device according to claim 1, wherein said unburned component oxidizing means comprises a catalyst arranged in the exhaust passage downstream of said $NO_x$ absorbent, and said catalyst has a function of oxidizing the unburned components by oxygen stored in said catalyst.

3. An exhaust gas purification device according to claim 2, wherein said catalyst contains cerium therein.

4. An exhaust gas purification device according to claim 1, wherein said unburned component oxidizing means comprises a secondary air supply device for feeding a secondary air into the exhaust passage downstream of said $NO_x$ absorbent to oxidize the unburned components.

5. An exhaust gas purification device according to claim 4, wherein said secondary air supply device feeds the secondary air into the exhaust passage during the time said air-fuel ratio of exhaust gas is rich.

6. An exhaust gas purification device according to claim 4, wherein an oxidizing catalyst is arranged in the exhaust passage downstream of said $NO_x$ absorbent, and said secondary air is fed into the exhaust passage between said $NO_x$ absorbent and said oxidizing catalyst.

7. An exhaust gas purification device according to claim 1, wherein said predetermined richness is increased as a temperature of said $NO_x$ absorbent becomes high.

8. An exhaust gas purification device according to claim 1, wherein said air-fuel ratio control means gradually reduces the richness of the exhaust gas after increasing it to said predetermined richness and then maintain said air-fuel ratio of exhaust gas at the stoichiometric air-fuel ratio.

9. An exhaust gas purification device according to claim 8, wherein a time during which said air-fuel ratio of exhaust gas is maintained at the stoichiometric air-fuel ratio is made shorter as a temperature of said $NO_x$ absorbent becomes high.

10. An exhaust gas purification device according to claim 1, wherein said air-fuel ratio control means controls said air-fuel ratio of exhaust gas by controlling an air-fuel ratio of air-fuel mixture fed into the engine.

11. An exhaust gas purification device according to claim 1, wherein said $NO_x$ absorbent contains at least one substance selected from alkali metals comprising potassium, sodium, lithium, cesium; alkali earth metals comprising barium, calcium; and rare earth metals comprising lanthanum, yttrium and contains platinum.

* * * * *